Feb. 13, 1973   R. D. ORLIK   3,715,993
CABLE REEL CAR

Filed March 8, 1971   9 Sheets-Sheet 1

INVENTOR
RICHARD D. ORLIK

BY Cushman, Darby & Cushman
ATTORNEYS

Feb. 13, 1973         R. D. ORLIK          3,715,993
              CABLE REEL CAR
Filed March 8, 1971                9 Sheets-Sheet 4

INVENTOR
RICHARD D. ORLIK

BY Cushman, Darby & Cushman
                ATTORNEYS

INVENTOR
RICHARD D. ORLIK
BY Cushman, Darby & Cushman
ATTORNEYS

Feb. 13, 1973   R. D. ORLIK   3,715,993
CABLE REEL CAR
Filed March 8, 1971   9 Sheets-Sheet 7

INVENTOR
RICHARD D. ORLIK
BY Cushman, Darby & Cushman
ATTORNEYS

Feb. 13, 1973   R. D. ORLIK   3,715,993
CABLE REEL CAR

Filed March 8, 1971   9 Sheets-Sheet 8

INVENTOR
RICHARD D. ORLIK
BY Cushman, Darby & Cushman
ATTORNEYS

Feb. 13, 1973   R. D. ORLIK   3,715,993
CABLE REEL CAR

Filed March 8, 1971   9 Sheets-Sheet 9

INVENTOR
RICHARD D. ORLIK
BY Cushman, Darby & Cushman
ATTORNEYS

United States Patent Office 3,715,993
Patented Feb. 13, 1973

3,715,993
CABLE REEL CAR
Richard D. Orlik, Jenison, Mich., assignor to The Chesapeake and Ohio Railway Company, Cleveland, Ohio, and The Baltimore and Ohio Railroad Company, Baltimore, Md.
Filed Mar. 8, 1971, Ser. No. 121,960
Int. Cl. B60p 7/08; B61d 45/00
U.S. Cl. 105—36.7
9 Claims

ABSTRACT OF THE DISCLOSURE

A railroad car for securing and hauling roughly cylindrically shaped loads and a method of securing such loads whereby the car bed has a plurality of sunken tracks which extend substantially from one end of the car to the other with a plurality of chock blocks mounted on the bed for movement along at least some of the tracks. The chock blocks are grouped in pairs with one block in each pair having a flat surface inclined toward one end of the car and the other a flat surface facing the flat surface of the first and inclined toward the opposite end of the car so that a load can be secured between each pair with the curved surface of the load contacting the flat surfaces of the two blocks. A number of chain anchors are also preferably mounted movably in each of the two outer sunken tracks for attachment to a chain with the portion of the chain between the points of attachment to the anchors passing through and securing the load. A plurality of adjustable lateral support members are also mounted removably on each of the flat surfaces of each block for engaging and securing the ends of the loads.

Brief description of the prior art and summary of the invention

The invention relates to a railroad car or the like for securing and hauling cylindrically shaped loads, such as reels.

Materials such as cables and the like are usually wound on reels of various sizes for transport from one place to another on railroad cars, ships, trucks, etc. Because such loads can be unloaded with greatest facility when their axes lie in the horizontal, pointing toward the side of the car, and because they tend to roll in that position, racks are usually provided on the truck or railway car to hold cylindrically shaped loads securely in position during transport. The patents to James, 3,291,073, and Daly, 3,508,503, are examples of racks on railway cars for carrying loads of this type.

One of the primary difficulties with such racks is that coils, reels of material and other similar loads come in many different diameters and lengths. Consequently, when such racks are employed to haul loads having dimensions other than the specific dimensions which they are designed to carry, the different sized loads are not properly supported during transportation and/or considerable space is wasted which could be profitably employed to transport more loads. The present invention relates to a railway car or the like wherein the support members which hold the reels in place during transport are movable in tracks which run the interior length of the car deck to accommodate and properly secure a range of sizes of cylindrically shaped loads so that all available space is profitably employed.

This is accomplished, in the embodiment described in detail below, by means of a plurality of chock blocks which each extend across the width of the car and which are mounted in two or more sunken tracks or channels which run along the length of the car so that each chock can be moved to any desired position along the length of the car. The blocks are preferably grouped in pairs with one block in each pair having an inclined flat surface facing an inclined surface on the other block in that pair so that a cylindrically shaped load, such as a reel, can be held between each pair with the curved surface of the load contacting the flat surfaces of the two blocks. Alternatively, one block can be placed at one end of the car and another block at the other end to prevent the reels from rolling off either end. The reels are then held in place on the bed by other means, e.g. chains. In one embodiment these support members are removably mounted on the flat surface of each block.

Further, lateral support members, also termed lateral chock blocks, are also associated with each pair of chocks which hold a reel for engaging the ends of each load and separating loads which are supported between the same pair of chock blocks. These support members can be placed in any of a number of positions to accommodate different sized reels and different numbers of reels between the same pair of chock blocks. In another embodiment, the lateral support members extend between the pair of blocks to engage the ends of each load.

At least the outboard track channels preferably are provided with a plurality of chain tie-down anchors which are each movable along the channel in which they are mounted and which attach to a chain which preferably passes through the load or loads supported by a pair of chock blocks. The chain tie-down anchors each preferably includes turnbuckles with movable and retractable ratchet winches, as well as a locking mechanism for holding the anchor assembly in place when the chain is taut.

Such a car provides a maximum payload and maximum flexibility for unloading and loading while at the same time providing a single standard versatile car which can be easily adjusted to satisfactorily carry the maximum pay load of reels or other similar loads each held firmly and satisfactorily in place.

Many other objects and purposes of the invention will become clear from the detailed description of the drawings.

Detailed description of the invention

Figures 1, 13:
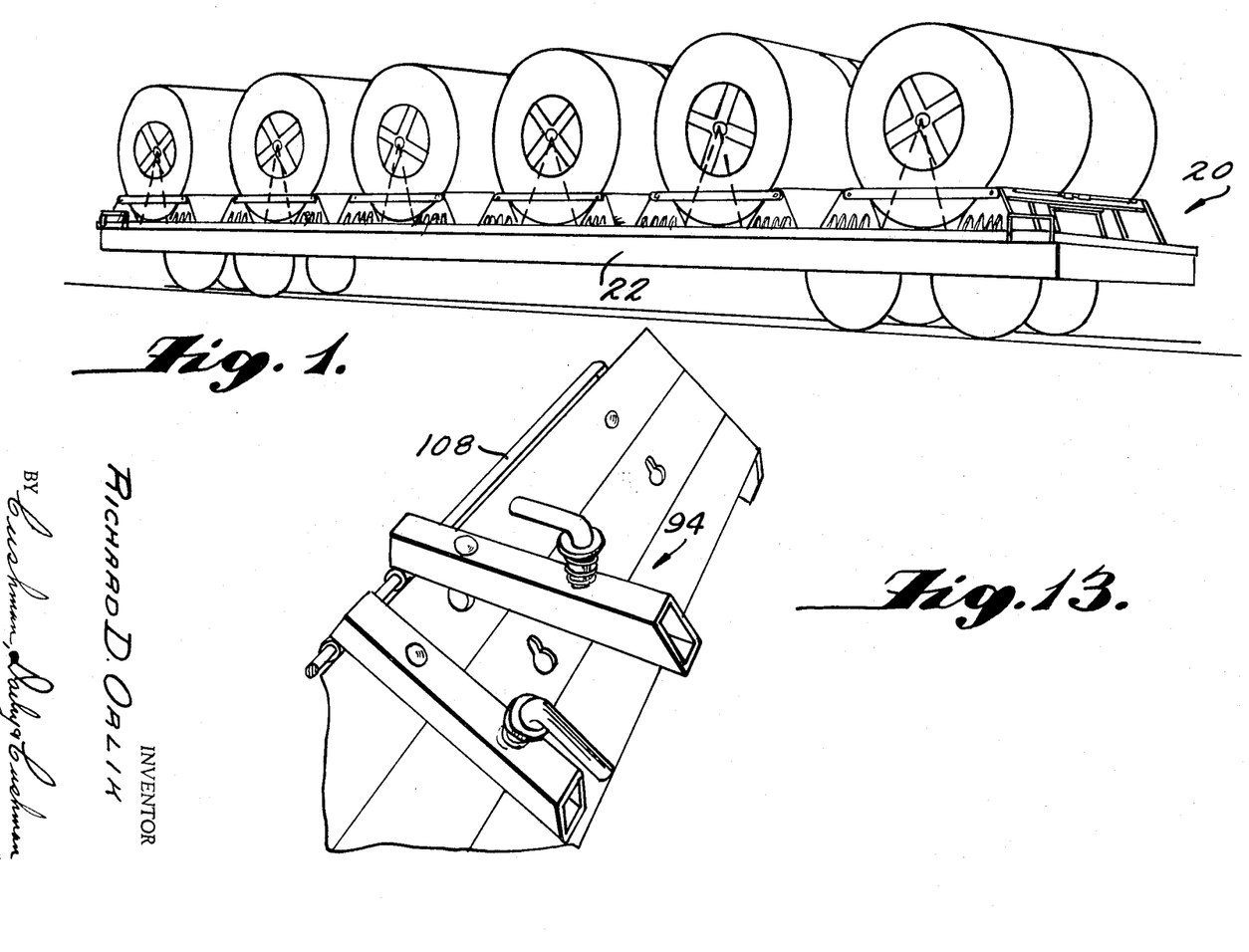
FIG. 1 shows a perspective view of one embodiment of the novel railroad car of this invention with a plurality of large reels mounted thereon.
FIG. 13 shows a perspective view of a lateral support member on a chock block.
Figure 2:
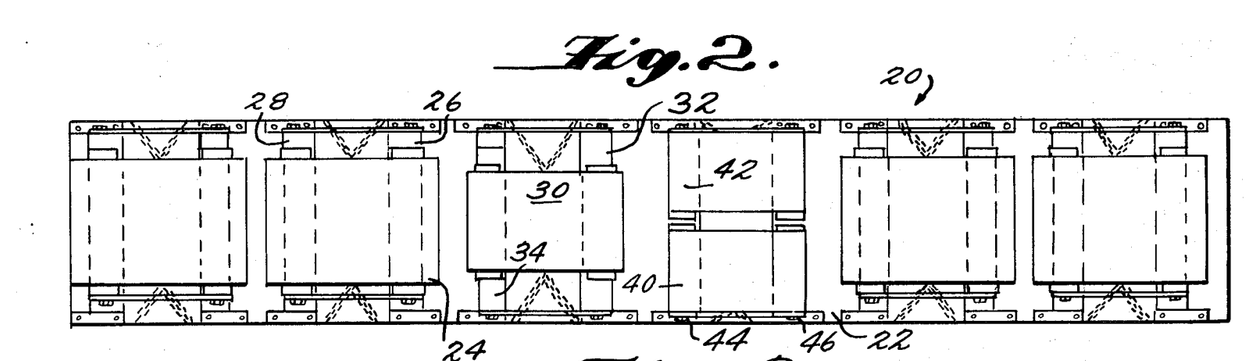
FIG. 2 shows a top schematic view of the car deck of FIG. 1.
Figure 3:
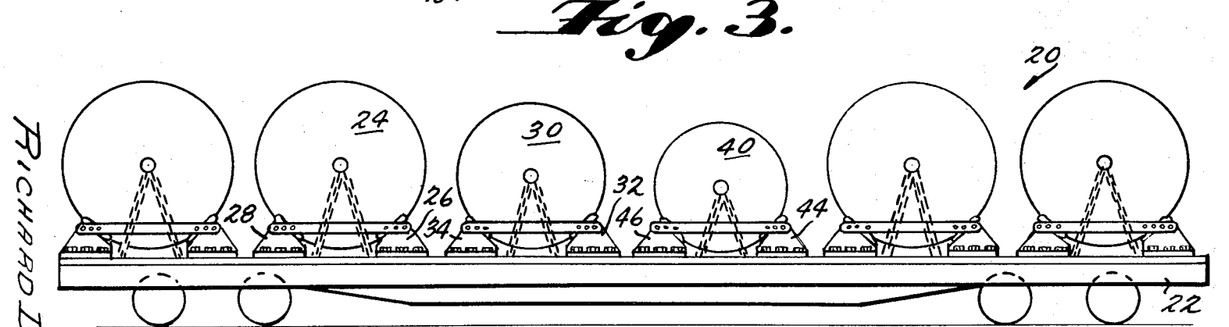
FIG. 3 shows a side view of the schematic of FIG. 2.

Reference is now made to FIGS. 1–3 which show respectively a perspective view of one embodiment of a railroad car according to this invention, a schematic top view of such a railroad car illustrating how reels of different sizes can be mounted on the car and a side view of the schematic of FIG. 2. Reel car 20 includes a flat bed 22 which is conventional in nature and similar to other flat bed cars now in use. It is contemplated that the deck of the car will be comprised of hardwood boards with a maximum of ⅛-inch variation between adjacent blanks and that the nominal capacity of the car will be roughly 70 tons, with an inside length of 60-ft. and an inside width of 10-ft. 5-in. These dimensions are, of course, exemplary and the car can be made to any size which is desirable.

Figure 4:
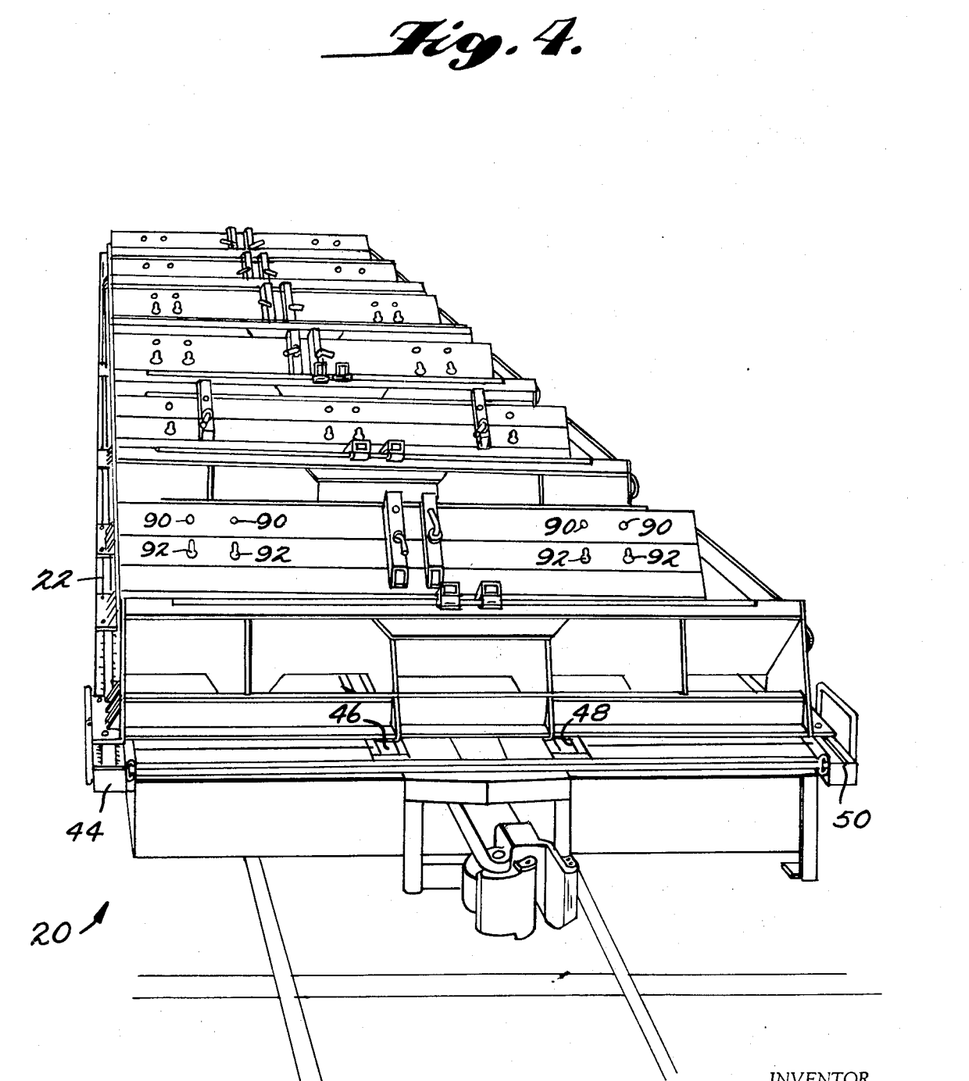
FIG. 4 shows a perspective view of the car of FIGS. 1-3 with the loads removed.

A plurality of pairs of chock blocks are mounted on bed 22 with each pair holding and securing between them a cylindrically shaped load, such as a reel of wire. For example, load 24 is mounted between blocks 26 and 28 in FIGS. 2 and 3, smaller load 30 between blocks 32 and 34, and loads 36 and 38 between blocks 40 and 42. As can be seen in FIG. 4, the blocks on bed 22 are each mounted for movement along four U-shaped tracks 44, 46, 48 and 50 which run substantially the length of car 20. Thus, the blocks can be positioned on bed 22 and locked as discussed below, to hold securely in the minimum space a cylindrically shaped load of any given diameter over a large range of diameters.

Figure 5:
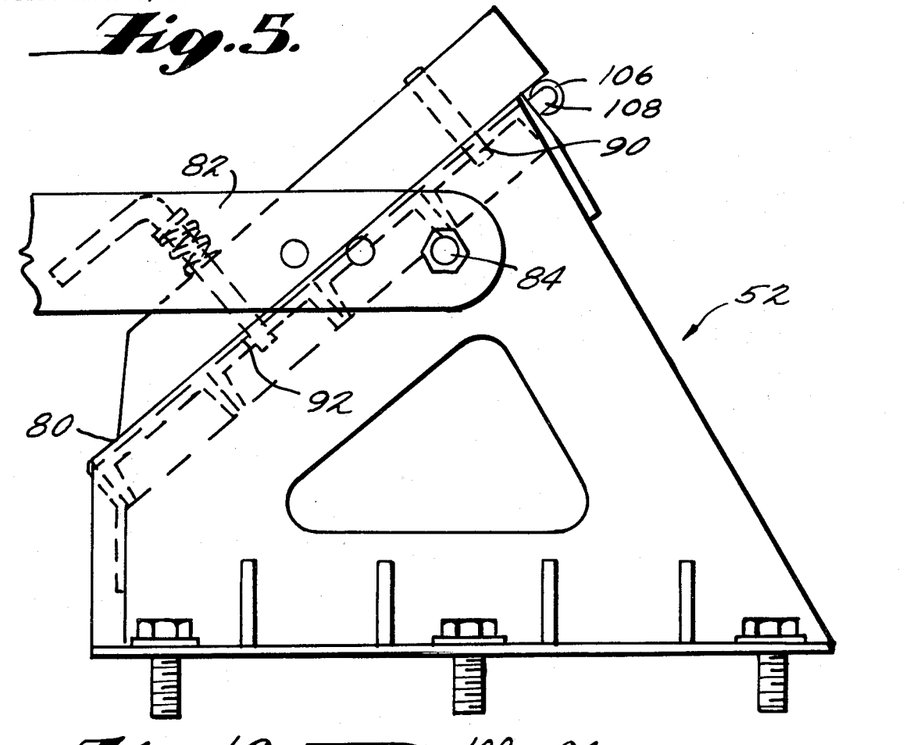
FIG. 5 shows a side view of a main chock block such as shown on the car of FIGS. 1-3.
Figure 6:
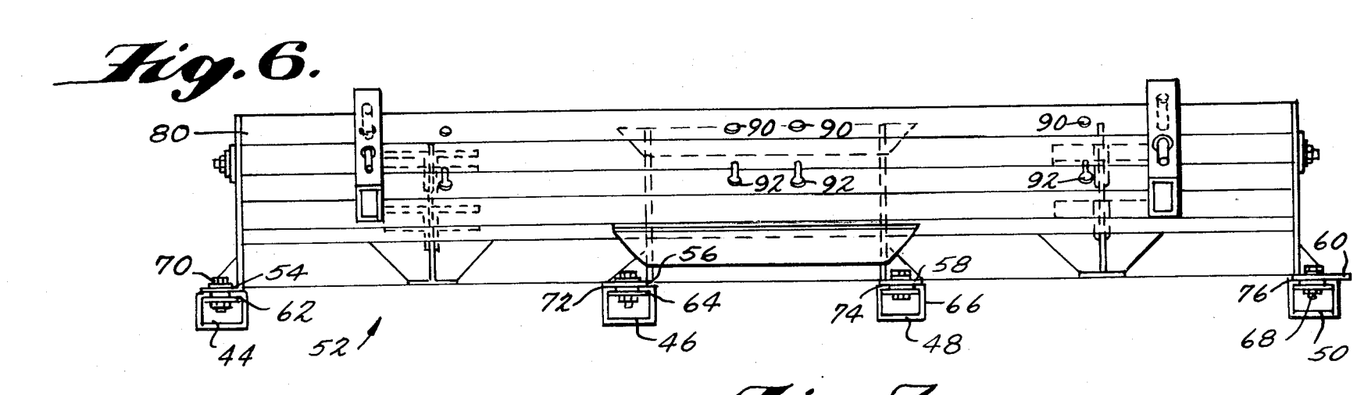
FIG. 6 shows a front view of the main chock block of FIG. 4.
Figure 7:
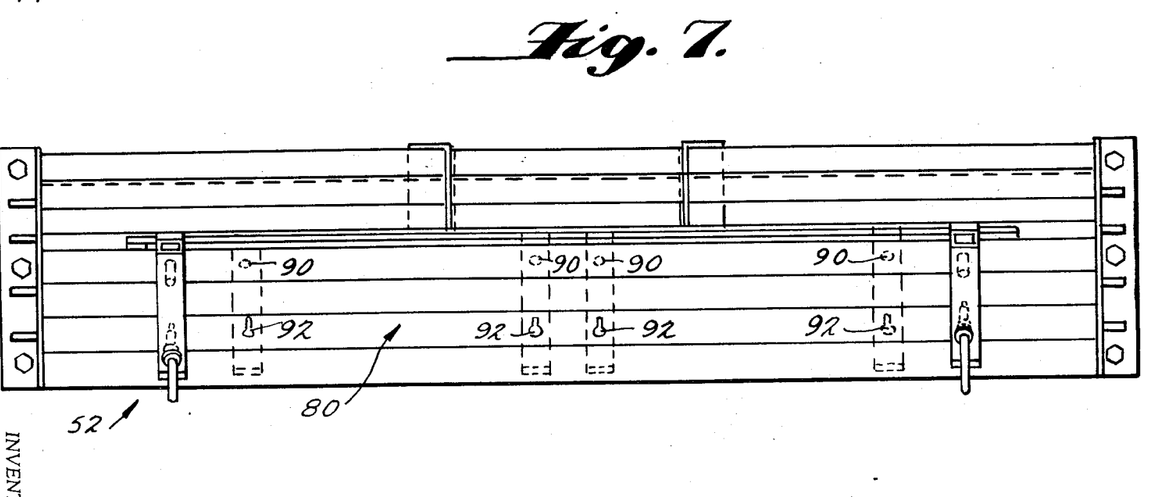
FIG. 7 shows a top plan view of the main chock block of FIG. 4.

Referring to FIGS. 5–7, a chock block 52 is shown which is typical of the blocks shown on car 20 in FIGS. 1–3. Block 52 includes a plurality of upper plate members 54, 56, 58 and 60 which are bolted to lower plates 62, 64, 66 and 68, respectively, by a number of bolts including bolts 70, 72, 74 and 76. Lower plates 62, 64, 66 and 68 ride in tracks 44, 46, 48 and 50, as can be seen in FIG. 6, so that chock block 52 can be moved to any position along a bed by loosening the bolts including bolts 70, 72, 74 and 76, and then locked in place by retightening the bolts.

Block 52 further is made from a plurality of steel or other metal members which are welded or otherwise fastened together to form a body having a relatively flat inclined surface 80. The blocks on a car are grouped in pairs on the car bed with the inclined surfaces of the blocks in each pair facing each other so that a cylindrically shaped load can be securely cradled with its curved surface contacting the two flat surfaces and its axis extending from one side of the car to the other side. In this position the loads can be quickly, easily, and efficiently loaded and unloaded from the car. The loads can be supported above the bed or touching the bed if desired.

Figures 8, 9:
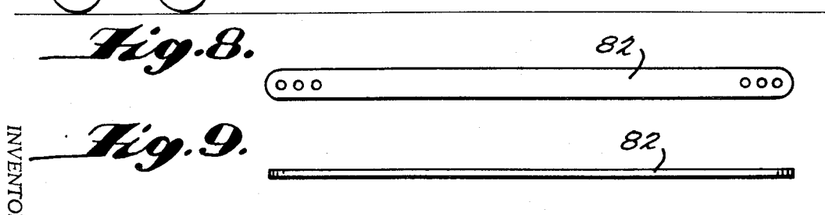
FIG. 8 shows a top view of the side bar of the car of FIGS. 1–3.
FIG. 9 shows a side view of the side bar of FIG. 7.

Each pair of blocks is preferably connected together by a side bar 82, which is preferably a steel bar having a plurality of apertures in it as can be seen in FIGS. 8 and 9. Bar 82 is shown connected to block 52 in FIG. 5 by a suitable bolt 84 and is similarly connected at its other end to another block paired with block 52. As can be seen in FIG. 2 the pairs are preferably connected at both sides by a side bar such as shown in FIGS. 8 and 9. The same bar can be used for different spacings between pairs for hauling loads having different diameters by bolting the bar to the two blocks through different apertures.

Figures 10, 11, 12:
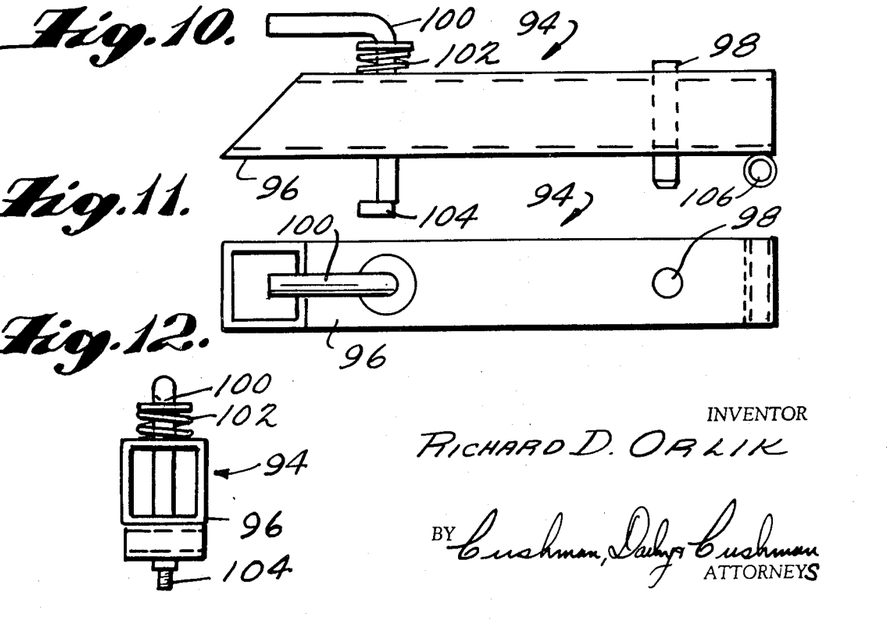
FIG. 10 shows a side view of a lateral support member.
FIG. 11 shows a top view of the lateral support member of FIG. 10.
FIG. 12 shows an end view of the lateral support member of FIG. 10.

Block 52, as well as the other blocks, is further provided with a plurality of pairs of apertures 90 and 92 across flat inclined surface 80 for receiving and locking a lateral support member, such as member 94 as shown in FIGS. 10–12. Member 94 includes a hollow square shaped structure 96 having a first passage through which a pin passes with pin 58 welded or otherwise attached to structure 96 and a second passage through which handle member 100 is journaled for movement back and forth through the passage with a spring 102 urging member 100 out of the passage and a key portion 104 of member 100 preventing member 100 from being withdrawn.

As shown in FIGS. 5 and 13, member 94 further includes a sleeve 106 or the like which is also welded or otherwise connected to structure 100. Sleeve 106 is slidably mounted on a bar 108 which is welded or otherwise connnected to the top of block 52 as shown. To place a lateral support member, such as member 94, at the location of any of the pairs of apertures 90 and 92 on the flat surface of a block such as block 52, it is only necessary to slide the member along bar 108 to the position of the pair of apertures, rotate the member about bar 108 with handle 100 pointing toward bar 108 as shown in FIG. 13 so that pin 106 passes through an aperture 90 and key portion 104 through an aperture 92 and then rotate handle 100 so that key portion 104 cannot return through the passage in structure 100 in which it is journaled. Spring 102 continuously urges handle 100 outward and keeps member 94 firmly locked in position. By appropriately placing lateral supports on each chock block the supports can then engage and support the ends of loads of many different lengths, as shown in FIGS. 2 and 3. Two or more loads can be mounted between the same pair of chock blocks with properly placed lateral support members separating and securing the ends of all of the loads, as shown.

Figure 14:
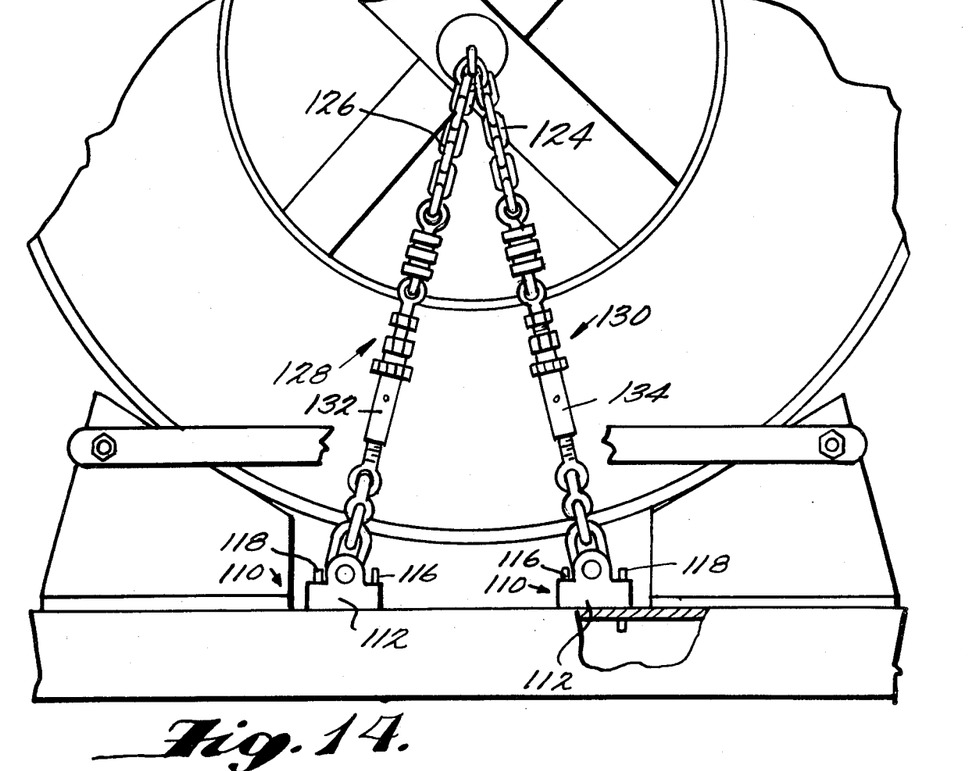
FIG. 14 shows a side view of two chain anchors and chains securing a load between a pair of chock blocks.
Figure 15:
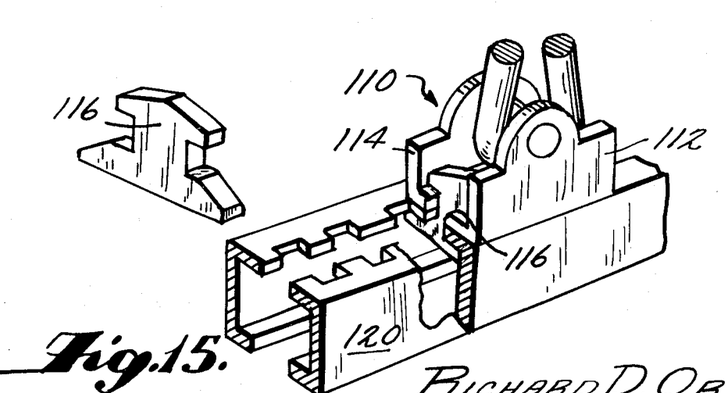
FIG. 15 shows a perspective view of the chain anchor assembly which holds the chain as shown in FIGS. 1–3.

To further secure the loads, a plurality of chain anchors are preferably provided in each of the two outlying tracks, such as tracks 44 and 50 in FIG. 4. FIGS. 14 and 15 show a typical chain anchor 110 and anchor 110 includes two opposed plate members 112 and 114 which hold between them plates 116 and 118 so that anchor 110 can be normally slid freely along track 120. However, when a chain is attached to anchor 110 and exerts an upward force, plate 116 engages the sides of the notches in track 120 and locks anchor 112 firmly in position.

As shown in FIG. 14 each load is preferably further secured in place by chains 124 and 126 which each attach to anchors 110 and 110 in one of the outlying tracks via turnbuckles 128 and 130, respectively, which includes retractable ratchet winches 132 and 134. A portion of both chain 124 and chain 126 passes through the load and attaches similarly to other anchors in the other outlying track.

Figure 16:
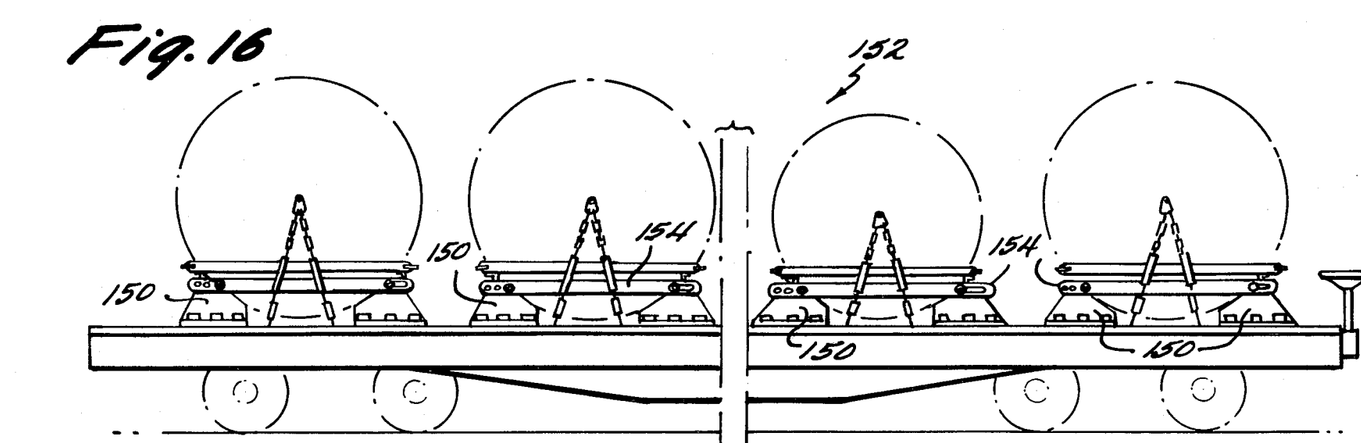
FIG. 16 shows a side view of another embodiment of the novel railroad car of this invention.
Figure 17:
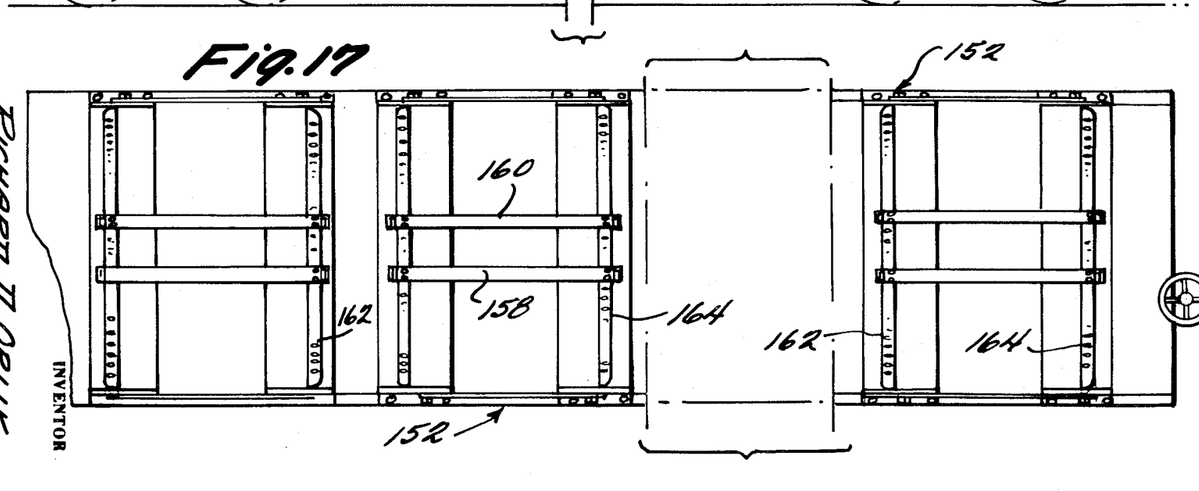
FIG. 17 shows a top view of the car of FIG. 16.

FIGS. 16 and 17 show a further embodiment of the invention in which a number of clock blocks, such as block 150, are mounted in a plurality of tracks in the bed of a car 152 so that the blocks can be moved along the length of the car as discussed above. As in the embodiment above, the separation between each pair of blocks can be varied as necessary to properly secure cylindrically shaped loads of different sizes. The blocks, such as block 150, similarly have inclined surfaces for engaging the curved surface of the load and each pair of blocks is secured together at its ends by side bars, such as bars 154 and 156. Chains, which may attach to chain anchors which move in tracks in the car bed as discussed above, also secure each load in position as shown.

However, the lateral chock members, such as members 158 and 160, each extend between each pair of blocks to engage an end of one of the loads. Each block has a lateral bar, such as members 162 and 164, which is welded or otherwise attached to the top of that block and extends from one side of the car to the other. Each such bar has a plurality of apertures and each lateral member at least a single pin at each end so that a member can be placed at any of a plurality of positions across the width of the car to engage the side of a load of any of a number of sizes by engaging the pins at each end with any of the apertures of the bars of opposing blocks.

Figures 18, 19, 20:
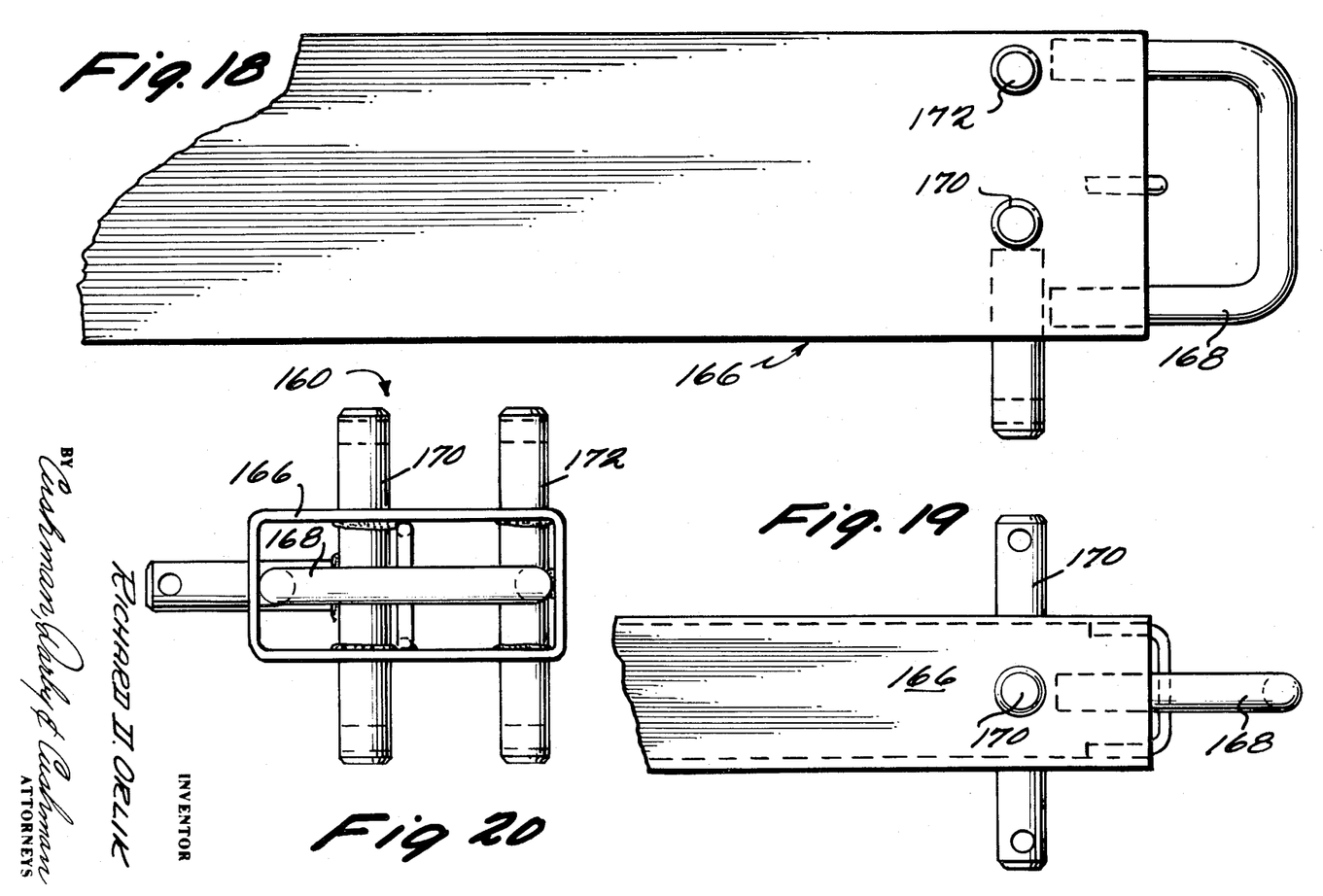
FIG. 18 shows a top view of one of the lateral support members of the embodiment of FIG. 16.
FIG. 19 shows a side view of the lateral support member of FIG. 18.
FIG. 20 shows a front view of the lateral support member of FIG. 18.
Figure 21:
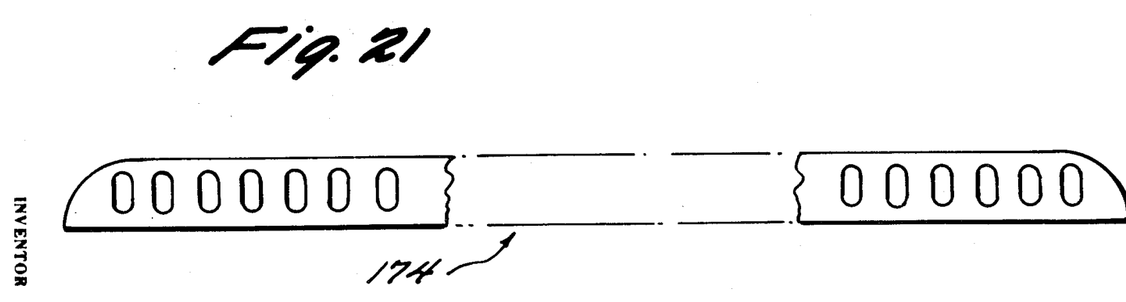
FIG. 21 shows a top view of the lateral support member bar.

FIGS. 18–20 show a lateral member 160 which is comprised of a bar portion 166 which engages the load, handle portions, such as portion 168 at each end for facilitating changing the positions of the members and a pair of pins 170 and 172 which extend above and below the bar portion at each end of member 160 and which fit through adjacent apertures in a bar, such as bar 174 shown in FIG. 21. Means for locking a lateral member in position can be provided if desired and a lock pin can be employed for this purpose.

Figure 22:
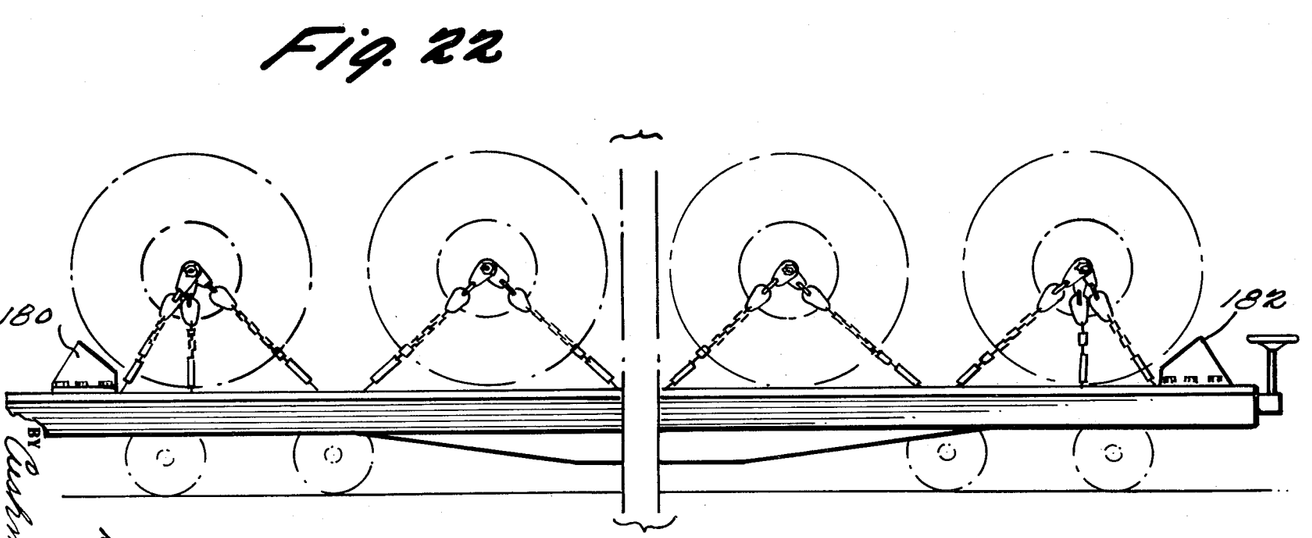
FIG. 22 shows a side view of another embodiment of the novel railroad car of this invention.

FIG. 22 shows a further embodiment in which a pair of chock blocks 180 and 182 are mounted at opposite ends of the bed of a car 184 to prevent the loads from rolling off the ends. The loads are securely held in position by chains as shown and, as above, blocks 180 and 182 can be moved along the bed of car 184 in tracks to any desired position.

Many changes and modifications in the above embodiment of the invention can, of course, be made without departing from the scope of that invention. Accordingly, that scope is intended to be limited only by the scope of the appended claims.

I claim:

1. A railroad car for securing and hauling roughly cylindrically shaped loads having two opposed substantially flat ends, and a circular cross section about an axis between said ends comprising:
    a bed having a plurality of tracks running along its length substantially from one end of the car to the other end, and
    a plurality of pairs of chock blocks movable in said tracks and extending above said bed for securing said cylindrically shaped loads one block of each pair having a surface inclined toward one end of said car and the other block a surface facing the inclined surface of said one block and inclined toward the other end of said car so that each pair of separated blocks supports a roughly cylindrically shaped load, the inclined surface of which contacts said inclined surfaces and which has its axis roughly extending from one side of said car to the other, each of said surfaces having a plurality of key slots,
    a bar mounted along the top of each said chock block, and
    a plurality of lateral support members attached to each of said blocks for each engaging and securing said flat ends of one of said cylindrically shaped loads, said support members being removable from said blocks with each inclined surface constructed so that a support member can be attached to that surface at any of a plurality of separated locations for hauling cylindrical shaped loads having different dimensions from flat end to flat end along the axis and each of said support members including a body member means for mounting said body member on a bar for a movement along that bar, a handle member attached to said body member, movable and rotatable with respect to said body member and having a key portion for passing through one of said key slots in a first angular position and not passing through said key slot in a second angular position for locking that support member to that block and a spring member mounted in said body member for urging said handle member away from that inclined surface.

2. A car as in claim 1 wherein said bed has first and second further tracks and further including a plurality of chain anchors movable in one or the other of said first and second tracks.

3. A car as in claim 2, wherein said further tracks are disposed between said first and second tracks.

4. A car as in claim 2, further including a plurality of chains each attaching to a chain anchor in one of said first and second tracks, passing through a cylindrically shaped load secured between a pair of said blocks and attaching to another chain anchor in the other of said first and second tracks.

5. A car as in claim 2, wherein said first and second and said plurality of tracks are sunk into said bed.

6. A car as in claim 1 wherein each said support member includes a bar extending from one of said blocks to the other of said blocks and engaging an end of said load.

7. A car as in claim 6, further including a lateral support member bar attached to each of said blocks, extending along the length of said block and having a plurality of apertures and wherein said support member includes at least a single pin engaging an aperture of a bar on one of said blocks and at least a single pin engaging an aperture of a bar on another of said blocks.

8. A car as in claim 1 wherein said plurality of blocks are two with one of said blocks disposed at one end of said car and the other of said blocks disposed at the other end of said car.

9. A railroad car for securing and hauling roughly cylindrically shaped loads having two opposed substantially flat ends and a circular cross section about an axis between said ends comprising:
    a bed having a plurality of tracks running along its length substantially from one end of the car to the other end,
    a plurality of pairs of chock blocks movable in at least two of said tracks for securing said cylindrically shaped loads, one block of each pair having a surface inclined toward one end of said car and the other block a surface facing the inclined surface of said one block and inclined toward the other end of said car so that each pair of separated blocks supports a cylindrically shaped load which contacts said inclined surfaces and which has an axis extending roughly from one side of said car to the other, each of said surfaces having a plurality of key slots,
    a bar mounted along the top of each chock block,
    a plurality of chain anchors each movable in one of said plurality of tracks other than the tracks in which said blocks are movable for attaching to a chain which passes through said load and attaches to another chain anchor in another track, and
    a plurality of lateral support members each removably attached to one of said blocks for engaging and securing an end of one of said cylindrically shaped loads with each inclined surface constructed so that a support member can be attached to that surface at any of a plurality of separated locations for hauling cylindrically shaped loads having different dimensions from flat end to flat end along the axis, each support member including a body member means for mounting said body member on a bar for movement along that bar, a handle member attached to said body member, movable and rotatable with respect to said body member and having a key portion for passing through one of said key slots in a first angular position for locking that support member to that block and a spring member mounted in said body member for urging said handle member away from that inclined surface.

References Cited

UNITED STATES PATENTS

| | | | |
|---|---|---|---|
| 3,481,627 | 12/1969 | Felburn | 105—369 A |
| 3,299,989 | 1/1967 | Santosuosso | 105—368 T |
| 1,837,657 | 12/1931 | Fedderman | 105—368 T |
| 1,733,269 | 10/1929 | Mauk et al. | 105—368 T |
| 2,128,667 | 8/1938 | Atherton | 105—368 T |
| 1,047,048 | 12/1912 | Harrison | 105—368 T |
| 3,130,689 | 4/1964 | Johnston | 105—369 B |
| 3,392,682 | 7/1968 | Francis | 105—367 |
| 3,291,073 | 12/1966 | James | 105—367 |
| 3,508,503 | 4/1970 | Daly | 105—369 B |

DRAYTON E. HOFFMAN, Primary Examiner

U.S. Cl. X.R.

105—368 T, 369 A, 369 C